(12) United States Patent
Hanazawa et al.

(10) Patent No.: US 6,400,427 B1
(45) Date of Patent: *Jun. 4, 2002

(54) ACTIVE MATRIX LIQUID CRYSTAL DISPLAY DEVICE

(75) Inventors: Yasuyuki Hanazawa; Kohei Nagayama, both of Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/531,143

(22) Filed: Mar. 17, 2000

(30) Foreign Application Priority Data

Mar. 18, 1999 (JP) .............................. 11-073488
Feb. 25, 2000 (JP) ........................ 2000-049891

(51) Int. Cl.[7] .................... G02F 1/136; G02F 1/1343
(52) U.S. Cl. ..................... 349/44; 349/38; 349/139; 349/40
(58) Field of Search ............................. 349/38, 39, 110, 349/139, 111, 40, 49

(56) References Cited

U.S. PATENT DOCUMENTS

| | | | | |
|---|---|---|---|---|
| 5,528,395 A | * | 6/1996 | So | 349/38 |
| 5,953,088 A | | 9/1999 | Hanazawa et al. | 349/143 |
| 6,049,369 A | * | 4/2000 | Yanagawa et al. | 349/139 |
| 6,088,070 A | * | 7/2000 | Ohtani et al. | 349/38 |
| 6,219,118 B1 | * | 4/2001 | Zhang | 349/110 |

* cited by examiner

*Primary Examiner*—Toan Ton
(74) *Attorney, Agent, or Firm*—Pillsbury Winthrop LLP

(57) ABSTRACT

Each pixel electrode is connected to a signal line and a scanning line through a TFT while at least part thereof overlaps the signal lines. A plurality of shield electrodes having electrostatic shielding characteristic extend from an auxiliary capacitance line, which extends perpendicular to the signal lines, each along the signal line. Each shield electrode has a first electrode portion arranged to overlap only a side edge portion of one of two adjacent pixel electrodes and a side edge portion on a side of one pixel electrode of the signal line side edge portions, and a second electrode portion arranged to overlap only a side edge portion on the other pixel electrode. An overlapping width between the shield electrode and pixel electrode is larger than the overlapping width between the signal line and pixel electrode.

18 Claims, 9 Drawing Sheets

ACTIVE MATRIX LIQUID CRYSTAL DISPLAY DEVICE

CROSS-REFERENCE TO RELATED APPLICATIONS

This application is based upon and claims the benefit of priority from the prior Japanese Patent Applications No. 11-073488, filed Mar. 18, 1999; and No. 2000-049891, filed Feb. 25, 2000, the entire contents of which are incorporated herein by reference.

BACKGROUND OF THE INVENTION

The present invention relates to an active matrix liquid crystal display device in which each of display pixel electrodes is constituted with a thin-film transistor as a switching element.

Recently, a liquid crystal display device capable of achieving high-function and high-precision representation of pictures despite a high density and a high capacity has been developed. Although there are various types of the liquid crystal display device, the active matrix liquid crystal display device has been most often used, because a crosstalk between adjacent pixels is small, a high contrast image can be obtained, transmissive display can be achieved, a large area representation can be achieved and other reasons.

Generally, the active matrix liquid crystal display device has an array substrate. This array substrate includes pixel electrodes disposed in plural regions in a matrix configuration, sectioned by plural scanning lines and plural signal lines disposed such that they intersect each other. Each of the pixel electrodes is connected to the scanning line and signal line through a thin-film transistor (hereinafter referred to as TFT) functioning as a switching element.

Although the display quality of such a TFT liquid crystal display device is affected by parasitic capacity between the signal lines and pixel electrodes, an influence of this parasitic capacity can be suppressed by forming an auxiliary capacity or disposing shield electrodes fixed to a predetermined potential so as to overlap the pixel electrodes and signal lines through a layer insulating film.

However, because a large auxiliary capacity is needed to suppress an influence of the parasitic capacity, this is the reason for reducing the aperture ratio of the liquid crystal display device. Further, when the shield electrodes are provided, the load capacity of the signal lines is increased so that the driving load of an incorporated circuit is increased.

Thus, for solving the above problems, the inventors of the present invention have proposed a system wherein a light-sealing layer is formed by the signal lines and shield electrodes. However, the liquid crystal display device having such a structure contains a new problem that when its display screen is observed obliquely from the right and left, light leaks so that contrast drops.

On the other hand, in a liquid crystal display device of a type in which the pixels are disposed above, each of the pixel electrodes cannot be connected directly to a source electrode. Thus, the pixel electrodes are connected to the source electrodes via through holes formed in organic insulating film, and via pixel connecting electrodes formed at the same time as the signal lines.

In this case, taking into account a forming accuracy of the through holes, each of the pixel connecting electrodes is formed in a size larger than that of the through hole. However, because the pixel connecting electrodes are formed at the same time as the signal lines, a maximum size of the pixel connecting electrode is determined by dot pitch, minimum processing dimension and signal line width. If the dot pitch is small, necessarily, the size of the pixel connecting electrode is decreased and at the same time, the through hole diameter of the organic insulating film is also decreased.

Usually, workability of the through holes is low because the film thickness of the organic insulating film is as thick as 2 to 4 $\mu$m. Thus, if the through hole diameter is small, point defect due to through hole forming error may be generated. Although it can be considered to enlarge the through hole diameter of the organic insulating film along the signal lines, in this case, it comes that the aperture ratio drops.

BRIEF SUMMARY OF THE INVENTION

The present invention has been contrived in consideration of the above circumstances, and its object is to provide an active matrix type liquid crystal display device having a high display quality in which an occurrence of display error is reduced.

Another object of the present invention is to provide an active matrix type liquid crystal display device in which the display quality thereof is improved by reducing the image error and which is capable of achieving high quality representation of pictures without reduction of the aperture ratio while preventing a through hole forming error when the pixel electrode is electrically connected to the pixel connecting electrode.

To achieve the above object, according to an aspect of the present invention, there is provided an active matrix type liquid crystal display device comprising: first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of pixel electrodes each of which is arranged in a region surrounded by the scanning lines and the signal lines and connected to an intersection between the signal line and the scanning line via a switching element, each of the pixel electrodes being formed on a layer above the signal lines such that at least part of the pixel electrode overlaps the signal lines; a plurality of auxiliary capacitance lines formed on a layer below the signal lines, each of the auxiliary capacitance lines being arranged between the two adjacent scanning lines and extending in a direction substantially perpendicular to the signal lines; and a plurality of shield electrodes having electrostatic shielding characteristic and extending from the auxiliary capacitance lines along the signal lines.

Each of the shield electrodes has a first electrode portion arranged to overlap only a side edge portion of one of two adjacent pixel electrodes and a side edge portion on the side of the one pixel electrode of the signal line side edge portions; and a second electrode portion arranged to overlap only a side edge portion of the other pixel electrode and the other side edge portion of the signal line, an overlapping width between the shield electrode and the pixel electrode being larger than an overlapping width between the signal line and the pixel electrode.

Further, according to another aspect of the present invention, there is provided an active matrix type liquid crystal display device comprising: first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of pixel electrodes each of which is arranged in a region surrounded by the scanning lines and the signal lines and connected to an intersection between the signal line and the scanning line via a switching element, each of the pixel electrodes being formed on a layer above the signal lines such that at least part of the pixel electrode overlaps the signal lines; and a plurality of shield electrodes having electrostatic shielding characteristic and extending from the scanning lines along the signal lines.

Each of the shield electrodes has a first electrode portion arranged to overlap only a side edge portion of one of two adjacent pixel electrodes and a side edge portion on the side of the one pixel electrode of the signal line side edge portions; and a second electrode portion arranged to overlap only a side edge portion of the other pixel electrode and the other side edge portion of the signal line, an overlapping width between the shield electrode and the pixel electrode being larger than an overlapping width between the signal line and the pixel electrode.

In the active matrix type liquid crystal display device having such a structure, each of the shield electrodes having electrostatic shielding characteristic is formed by extending part of the auxiliary capacitance line or scanning line, intersects the signal line within a single pitch of the pixels, and overlaps partially a peripheral portion of an adjacent pixel electrode. Thus, an increase of the load capacity of the signal lines is suppressed while a sufficient electrostatic shielding characteristic is maintained. Consequently, an active matrix type liquid crystal display device having a high aperture ratio can be achieved.

Further, by increasing the overlapping width between the shield electrode provided below the signal lines and the pixel electrode, light leakage in an oblique direction decreases. As a result, reduction of contrast does not occur at the time of observation from the right or left sides. Consequently, an active matrix type liquid crystal display device having an excellent display performance can be achieved.

Further, according to still another aspect of the present invention, there is provided an active matrix type liquid crystal display device comprising: first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of auxiliary capacitance lines each arranged between the two adjacent scanning lines and extending in a direction substantially perpendicular to the signal lines; a plurality of shield electrodes having electrostatic shielding characteristic and extending from the auxiliary capacitance lines along the signal lines; and a plurality of pixel electrodes each of which is arranged in a region surrounded by the signal lines and the auxiliary capacitance lines and connected to an intersection between the signal line and the scanning line via a switching element, each of the pixel electrodes being arranged such that at least part of the pixel electrode overlaps the signal lines and the auxiliary capacitance lines.

Each of the shield electrodes has first and second electrode portions extending in opposite directions from the auxiliary capacitance line along the signal line. The signal line located between two adjacent pixel electrodes has a first side edge portion overlapping one of the pixel electrodes and a second side edge portion overlapping the other pixel electrode. The first and second electrode portions of each shield electrode overlap only the other pixel electrode and the second side edge portion of the signal line.

An overlapping width between the one pixel electrode and the first side edge portion of the signal line is different from an overlapping width between the other pixel electrode, and the second side edge portion of the signal line and shield electrode.

Further, according to yet still another aspect of the present invention, there is provided an active matrix type liquid crystal display device comprising: first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of shield electrodes having electrostatic shielding characteristic and extending from the scanning lines along the signal lines; and a plurality of pixel electrodes each of which is arranged in a region surrounded by the signal lines and the scanning lines and connected to an intersection between the signal line and the scanning line via a switching element, each of the pixel electrodes being arranged such that at least part of the pixel electrode overlaps the signal lines and the scanning lines.

Each of the shield electrodes has first and second electrode portions extending in opposite directions from the auxiliary capacitance line along the signal line. The signal line located between two adjacent pixel electrodes has a first side edge portion overlapping one of the pixel electrodes and a second side edge portion overlapping the other pixel electrode. The first and second electrode portions of each shield electrode overlap only the other pixel electrode and the second side edge portion of the signal line.

An overlapping width between the one pixel electrode and the first side edge portion of the signal line is different from an overlapping width between the other pixel electrode, and the second side edge portion of the signal line and shield electrode.

In the liquid crystal display device having such a structure, the shield electrodes having electrostatic shielding characteristic extend in opposite directions from the auxiliary capacitance line or scanning line along the signal line and disposed so as to overlap only a side edge portion of the signal line. Therefore, intervals between the shield electrodes become unnecessary. Further, since the signal line and shield electrode have to overlap each other along only one side, the signal line can be formed in a minimum processing width. Consequently, a high aperture ratio can be achieved while the electrostatic shielding effect is maintained and picture quality defects such as cross-talk and unevenness in luminance can be reduced, so that higher quality representation of picture can be achieved.

Further, since that portion of each signal line which overlaps the auxiliary capacitance line or signal line and shield electrode is cut out so that the width thereof is smaller than the other portions, the end portion beside the auxiliary capacitance line or scanning line of the pixel connecting electrode can be expanded by a corresponding amount and the size of the through hole in the organic insulating film can be increased correspondingly. Consequently, forming error of the through holes can prevented, so that the active matrix type liquid crystal display device having few point defects and a high display quality can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 4B are views showing an active matrix type liquid crystal display device according to a first embodiment of the present invention: in which FIG. 1 is a perspective view showing the aforementioned liquid crystal display device;

FIG. 2 is a plan view showing part of an array substrate of the liquid crystal display device;

FIG. 3 is a sectional view of the liquid crystal display device taken along the line III—III of FIG. 2;

FIG. 4B is a sectional view of the array substrate along the line IVB—IVB of FIG. 2;

FIG. 9 is a plan view showing part of the array substrate of the liquid crystal display device;

FIG. 10 is a sectional view of the liquid crystal display device taken along the line X—X of FIG. 9;

FIG. 11 is a sectional view of the array substrate taken along the line XI—XI of FIG. 9;

DETAILED DESCRIPTION OF THE INVENTION

Hereinafter, an active matrix type liquid crystal display device according to an embodiment of the present invention will be described in detail with reference to the accompanying drawings.

Figure 1:
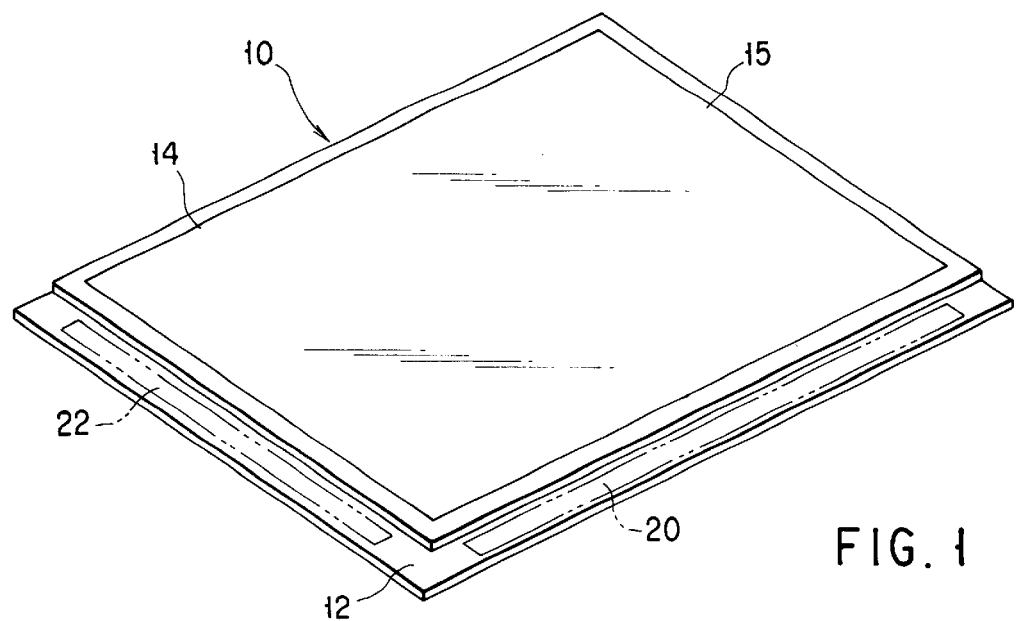
Figure 2:
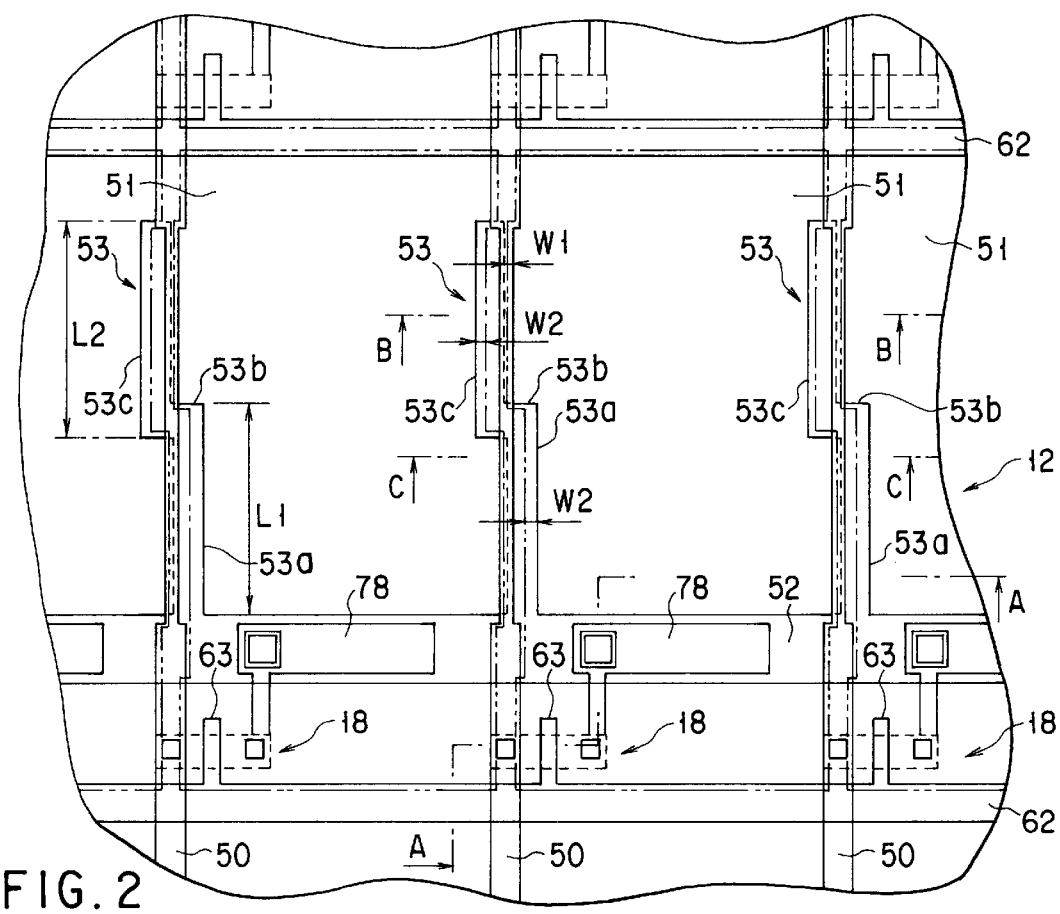
Figure 3:
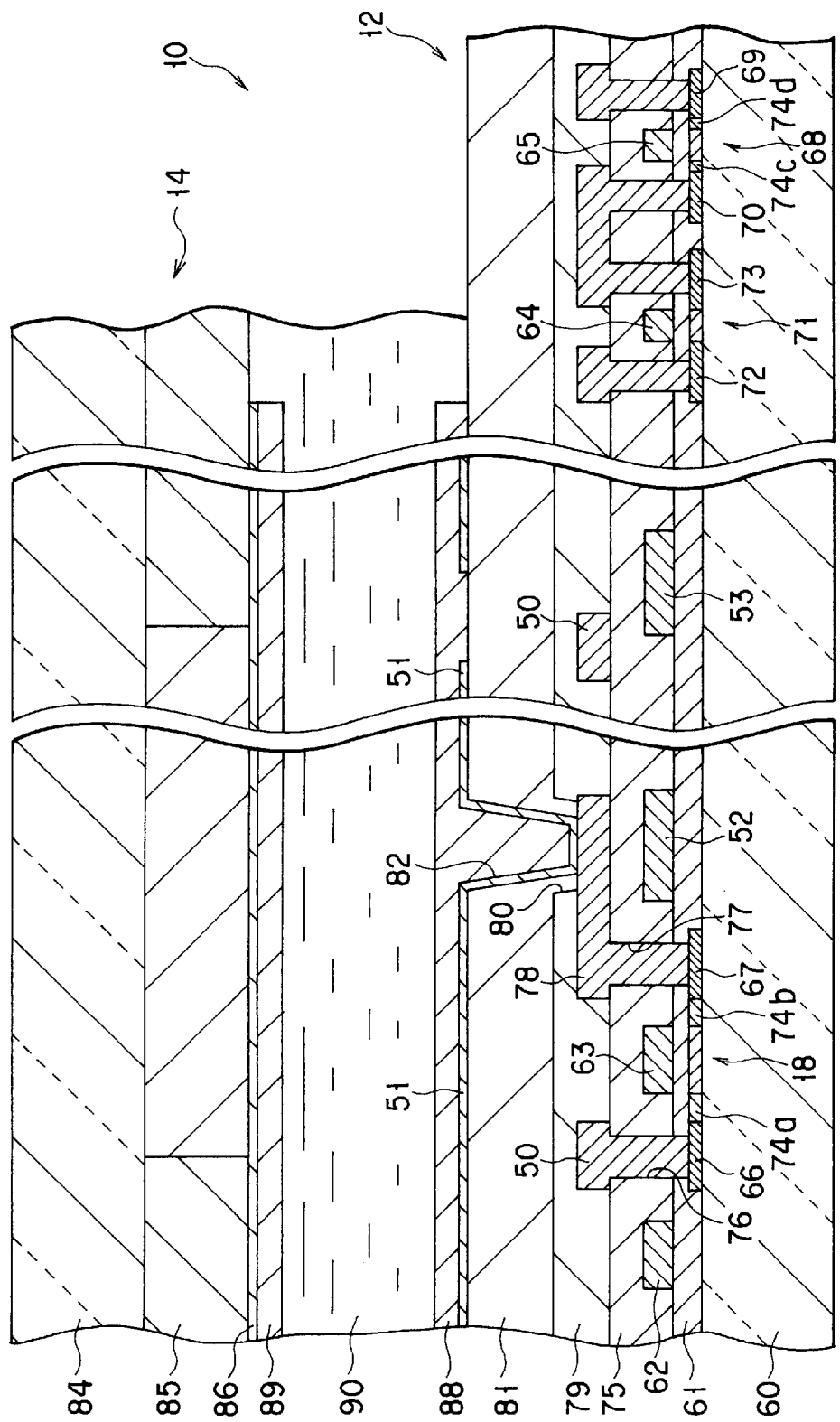

As shown in FIGS. 1 to 3, the active matrix type liquid crystal display device 10 is constructed as a transmissive liquid crystal display device having a rectangular display region 15 and comprises an array substrate 12 and an opposing substrate 14, both of them being rectangular. The array substrate 12 and opposing substrate 14 are bonded to each other with sealing agent (not shown) along their peripheries and opposite to each other with a predetermined gap. A liquid crystal layer 90 is sealed between the array substrate 12 and opposing substrate 14 via alignment films 88, 89.

As shown in FIGS. 1 to 3, the array substrate 12 has a glass substrate 60 as an insulating substrate and a plurality of the signal lines 50 and a plurality of the scanning lines 62 are formed on this glass substrate in a matrix manner such that they intersect each other substantially at right angles. The signal lines 50 are formed on the scanning lines 62 via a layer insulating film 75.

A pixel electrode 51 formed of ITO is provided in a region surrounded by two signal lines 50 and two scanning lines 62. Each pixel electrode 51 is connected to an intersection between the signal line 50 and scanning line 62 through a TFT 18 as a switching element. Each pixel electrode 51 is formed substantially in a rectangular shape so as to construct a single pixel.

A signal line driving circuit portion 20 is formed on an end portion on a long side of the array substrate 12. Further, a scanning line driving circuit portion 22 is formed on a short side thereof. A plurality of the signal lines 50 are introduced to the long side of the array substrate 12 and connected to the signal line driving circuit portion 20. Further, a plurality of the scanning lines 62 are introduced to the short side of the array substrate 12 and connected to the scanning line driving circuit portion 22.

Explaining further in detail, as shown in FIGS. 2, 3, each signal line 50 is formed in a linear shape and that portion thereof between the scanning line 62 and an auxiliary capacitance line 52 described later is formed in a smaller width than the other portion. Each pixel electrode 51 is arranged such that edge portions of a pair of short sides thereof overlap the scanning lines 62 by a predetermined width. Each of edge portions on the long sides of each pixel electrode 51 is formed in a step shape so that part thereof overlaps the signal line 50 by a predetermined width W1 while the other portion is provided with a predetermined gap relative to the signal line 50.

The array substrate 12 has auxiliary capacitance lines 52 each of which is disposed between two adjacent scanning lines 62 and extends in parallel to these scanning lines 62. The auxiliary capacitance lines 52 are formed by patterning the same layer as the scanning lines 62. The array substrate 12 has shield electrodes 53 each of which has have electrostatic shielding characteristic and is formed by extending part of the auxiliary capacitance line 52 along each signal line 50.

Each shield electrode 53 extends from the auxiliary capacitance line 52 up to near the scanning line 62 such that it is formed substantially in a key shape. That is, the shield electrode 53 comprises a first electrode portion 53a extending from the auxiliary capacitance line 52 in parallel to the signal line 50, a bent portion 53b extending from an end of the first electrode portion in a direction perpendicular to the signal line, and a second electrode portion 53c extending from the bent portion in parallel to the signal line.

The first electrode portion 53a is deviated to the right with respect to the signal line 50 in FIG. 2, while a side edge thereof overlaps the pixel electrode 51 on the right by a predetermined width W2 so as to shield a gap between the signal line 50 and pixel electrode. The other side edge is located overlapping only the signal line 50. Conversely, the second electrode portion 53c is deviated to the left relative to the signal line 50 in FIG. 2, while a side edge thereof overlaps the pixel electrode 51 on the left by a predetermined width W2 so as to shield a gap between the signal line 50 and pixel electrode. The other side edge is located overlapping only the signal line 50.

Further, the shield electrode 53 is so constructed that an electrode length L1 of the first electrode portion 53a is substantially equal to the electrode length L2 of the second electrode portion 53c so that influences of two signal lines adjacent across the pixel electrode 51 are equal to each other. Consequently, the influence upon the pixel electrode 51 of the signal line 50 connected to the TFT 18, that is, the signal line to the left of the pixel electrode is substantially the same as the influence of the signal line 50 not connected to the TFT, that is, the signal line to the right of the pixel electrode. Thus, an influence of the parasitic capacity between two signal lines 50 and pixel electrode 51 can be minimized.

Figure 4A:
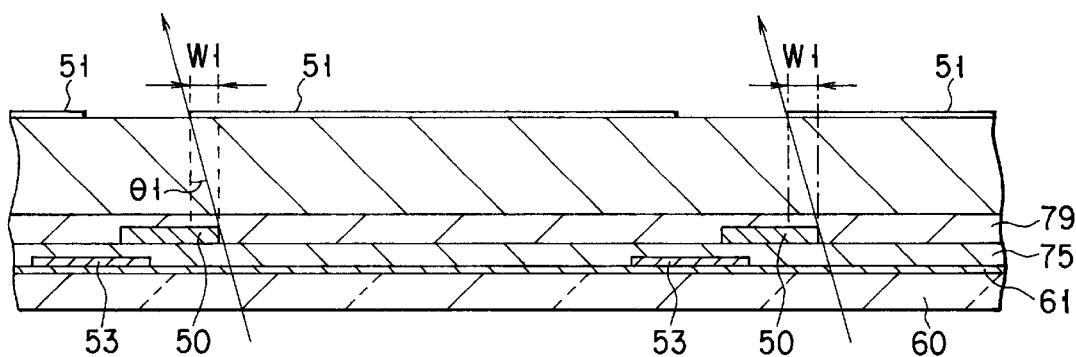
FIG. 4A is a sectional view of the array substrate along the line IVA—IVA of FIG. 2.
Figure 4B:
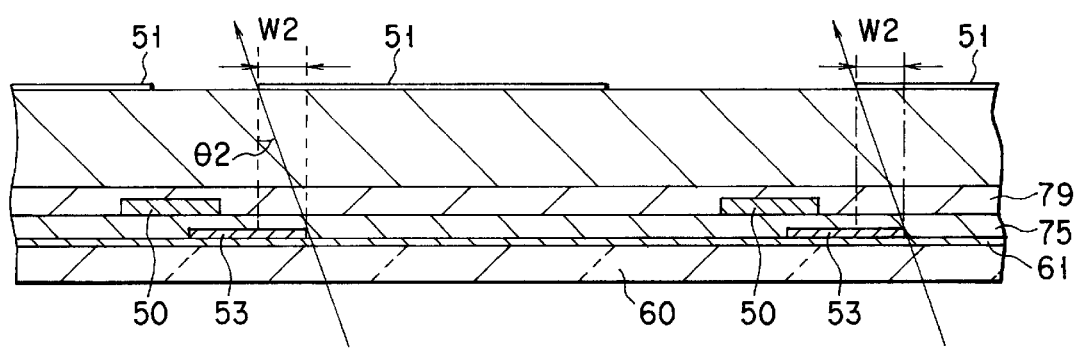

As shown in FIGS. 2, 4, the overlapping width W2 between the pixel electrode 51 and shield electrode 53 is larger than the overlapping width W1 between the pixel electrode 51 and signal line 50. Usually, a back light (not shown) is arranged below the array substrate 12. Consequently, for example in FIG. 4, in case where the screen of the liquid crystal display device is observed obliquely from the left, no light leaks from the back light until an angle between a vertical direction to the array substrate 12 and an observation direction becomes θ 1 in a portion in which the signal line 50 overlaps the pixel electrode 51. Likewise, in a portion in which the shield electrode 53 overlaps the pixel electrode 51, no light leaks from the back light until an angle between the vertical direction to the array substrate and the observation direction becomes θ 2, so that no reduction of contrast occurs.

If the widths W1, W2 of the overlapping portions are equal, θ 1>θ 2. This depends on a distance from the pixel electrode 51 to the signal line 50 or shield electrode 53. Because the shield electrode 53 acting as a light shielding layer is more apart from the pixel electrode 51 than the signal line 50 acting as the light-shielding layer, the angle θ 2 in which light leakage occurs is made smaller in the portion in which the pixel electrode overlaps the shield electrode.

However, if the overlapping width W1 between the pixel electrode 51 and the shield electrode 53 is formed larger than the overlapping width W2 between the pixel electrode 51 and the signal line 50 like this embodiment, the angle θ 2 in which light leakage occurs increases in the portion in which the light-sealing layer is formed of the shield electrode 53, so that even if the display screen of the liquid crystal display device is observed obliquely, reduction of contrast is small. As a result, an excellent display characteristic can be obtained.

Meanwhile, according to this embodiment, a difference (W2−W1) between the overlapping width W2 between the first electrode portion 53a of the shield electrode 53 and the pixel electrode 51 and the overlapping width W1 between the signal line 50 and the pixel electrode 51 is set to be substantially equal to the film thickness of the layer insulating film 75.

Next, the structure of the liquid crystal display device 10 will be described in detail with a production method thereof.

First, a-Si film is applied in thickness of about 50 nm on the insulating substrate 60 having light transmission characteristic such as high distortion point glass and quartz substrate according to CVD method. After this a-Si film is annealed for an hour at 450° in a furnace, XeCl excimer laser is projected thereover so as to polycrystallize a-Si. After that, the polycrystalline Si is patterned according to a photo-etching method, polysilicone film is formed, which will become channel layers of TFTs 18 for the pixel portions (hereinafter referred to as pixel TFT) in the display region and channel layers of the TFTs 68, 71 for the driving circuit portion (hereinafter referred to as circuit TFT).

Next, gate insulating film 61 composed of SiOx film is applied on an entire surface of the substrate 60 according to the CVD method in the thickness of about 100 nm. Subsequently, single body, its laminated film or alloy film of Ta, Cr, Al, Mo, W, Cu or the like is applied in the thickness of about 400 nm on an entire surface of the gate insulating film 61. Then, patterning in a predetermined shape is carried out by a photo-etching method so as to form the scanning lines 62 integrated with the gate electrodes, auxiliary capacitance lines 52, gate electrodes 63 of the pixel TFTs 18, gate electrodes 64, 65 of circuit TFTs 68, 71 and various wirings in the driving circuit portions 20, 22. At this time, the shield electrodes 53 are formed in a predetermined shape at predetermined positions at the same time when the auxiliary capacitance lines 52 are formed.

After that, impurity is implanted into the polysilicone film with the gate electrodes 63, 65 as mask according to ion implantation or ion doping method so as to form a drain electrode 66 and source electrode 67 of each pixel TFT 18. At the same time, a source electrode 69 and drain electrode 70 of each N-channel type circuit TFT 68 are formed. As for implantation of the impurity, phosphor is implanted in a high density by $PH_3/H_2$ with dose amount of $5\times10^{15}$ atoms/cm$^2$ at an accelerating voltage of 80 keV.

Subsequently, the pixel TFT 18 and the N-channel type circuit TFT 68 of the driving circuit portion are coated with resist so that no impurity is implanted into these portions. After that, with the gate electrode 64 of each P channel type circuit TFT 71 as mask, boron is implanted in a high density by $B_2H_6/H_2$ at dose amount of $5\times10^{15}$ atoms/cm$^2$ at accelerating voltage of 80 keV so as to form the source electrode 72 and drain electrode 73 of each P channel type circuit TFT 71.

After that, the impurity is implanted into each of the pixel TFT 18 and circuit TFT 68 so as to form N channel type LDD (lightly doped drain) 74a, 74b, 74c, 74d and then, by annealing the array substrate, the impurity is further activated.

Subsequently, the layer insulating film 75 composed of $SiO_2$ is applied in the thickness of about 500 nm on an entire surface of the insulating substrate 60. Further, a contact hole 76 leading to the drain electrode 66 of each pixel TFT 18, a contact hole 77 leading to the source electrode 67 and plural contact holes leading to the source electrodes 69, 72 and drain electrode 70, 73 of each circuit TFT 68, 71 are formed according to the photo-etching method.

Next, single body, its laminated film or alloy film of Ta, Cr, Al, Mo, W, Cu or the like is applied in the thickness of about 500 nm and then, patterning in a predetermined shape is carried out according to the photo-etching method so as to conduct wiring of the signal line 50, connection of the drain electrode 66 of the pixel TFT 18 with the signal line 50, connection of the auxiliary capacitance line of the source electrode 67 with an upper electrode 78 and wiring of the circuits TFT 68, 71 in the driving circuit region.

Further, protective insulating film 79 composed of SiNx is formed on an entire surface of the insulating substrate 60 according to the PECVD method and then, a contact hole 80 leading to the upper electrode 78 of the auxiliary capacitance element is formed by a photo-etching method. Next, after the entire surface of the substrate is coated with organic insulating film 81 in the thickness of about 3 $\mu$m and then, a contact hole 82 leading to the upper electrode 78 of the auxiliary capacitance element is formed.

Finally, ITO is formed in the thickness of about 100 nm on the organic insulating film 81 by a sputtering method and patterning in a predetermined shape is carried out by a photo-etching method so as to form the pixel electrodes 51. Then, the pixel electrode is connected to the upper electrode 78 of the auxiliary capacitance element through the contact holes 80, 82. Consequently, the array substrate 12 of the liquid crystal display device 10 is obtained.

On the other hand, the opposing substrate 14 is formed as an insulating substrate having transparency. It is obtained by forming a colored layer 85 in which pigment and the like are dispersed on the glass substrate 84, for example, and forming an opposing electrode 86 which is a transparent electrode composed of ITO according to the sputtering method.

Alignment films 88, 89 composed of low-temperature cure type polyimide are printed on the entire surfaces of the pixel electrode 51 of the array substrate 12 and the opposing electrode 86 of the opposing substrate 14. Then, rubbing processing is carried out so that the orientation axes are different by 90° when these substrates are disposed so as to oppose each other. After that, the array substrate 12 and the opposing substrate 14 are disposed so as to oppose and assembled into a cell unit. Then, nematic liquid crystal 90 is injected into a gap therebetween and that gap is sealed. Then, a polarizing plate is attached to each of outside faces of the insulating substrates 60, 84 of both the substrates 12, 14 so as to complete the liquid crystal display device 10.

In the liquid crystal display device having such a structure, the shield electrode 53, which is formed for each pixel in the array substrate 12, is formed only on a single side with respect to the signal line 50. Therefore, a necessity of the conventional gap between the shield electrodes is eliminated. Further, because the signal line 50 and the shield electrode 53 have to overlap each other only on a single side thereof, the signal line 50 can be formed with a minimum processing width.

Consequently, a high aperture ratio can be achieved while the same electrostatic shielding effect as conventional is maintained. As a result, picture quality failure such as cross-talk and uneven luminance is reduced so as to improve the display quality.

Further, because the overlapping width W2 between the pixel electrode 51 and shield electrode 53 is larger than the overlapping width W1 between the pixel electrode 51 and signal line 50, even if the screen of the liquid crystal display device is observed obliquely, light leakage is reduced and reduction of contrast is prevented, so that an excellent representation of images is achieved.

Figure 5:
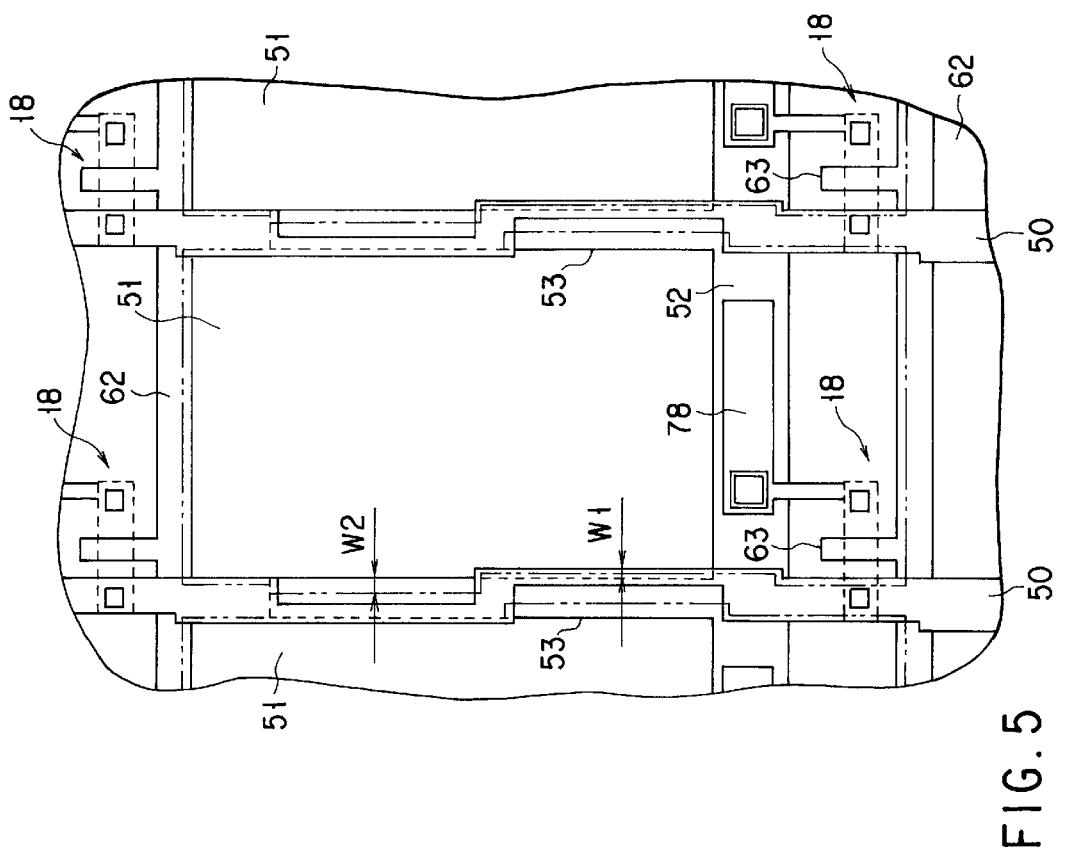
FIG. 5 is a plan view showing the array substrate of the liquid crystal display device according to a second embodiment of the present invention.

The present invention is not restricted to the above mentioned embodiment, however may be modified in various types within a scope of the invention. For example, it is permissible to form the shield electrode 53 in a linear shape and the signal line 50 in a key shape as shown according to the second embodiment of FIG. 5. In this case also, the same effect as the above described embodiment can be obtained by setting W2>W1.

Figure 6:
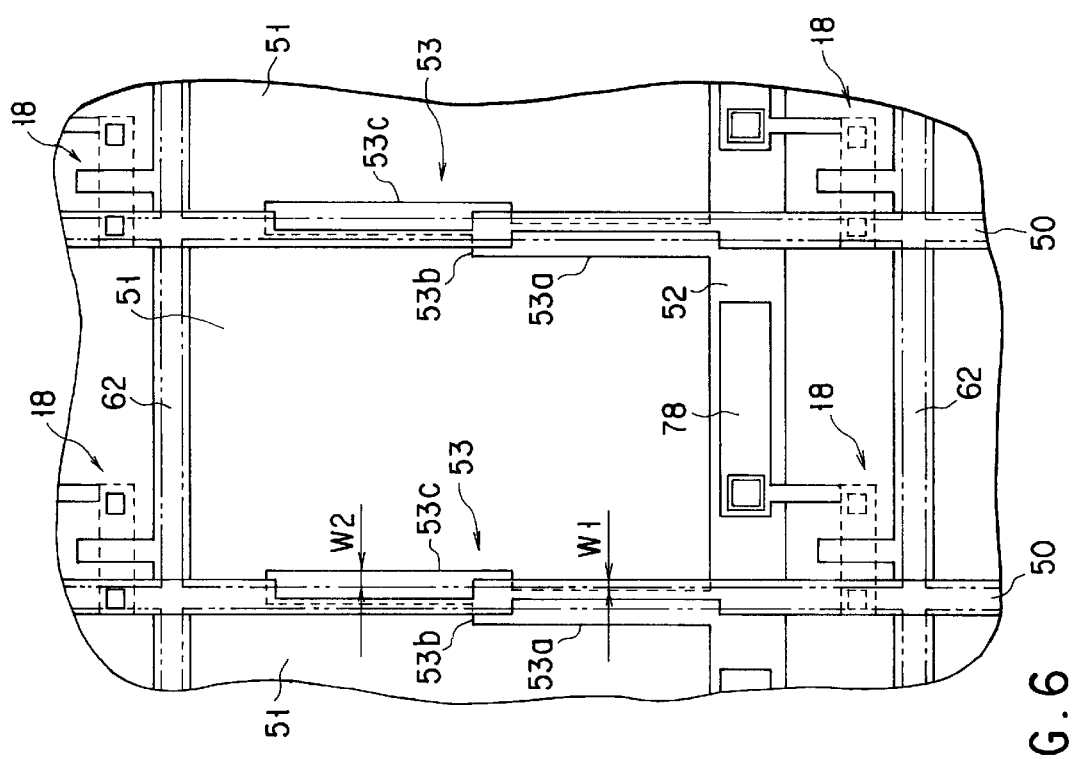
FIG. 6 is a plan view showing the array substrate of the liquid crystal display device according to a third embodiment of the present invention.

Further, according to a third embodiment shown in FIG. 6, both the shield electrode 53 and the signal line 50 are formed in the key shape. With such a structure, in addition to the above described operation and effect, a higher aperture ratio can be obtained.

Figure 7:
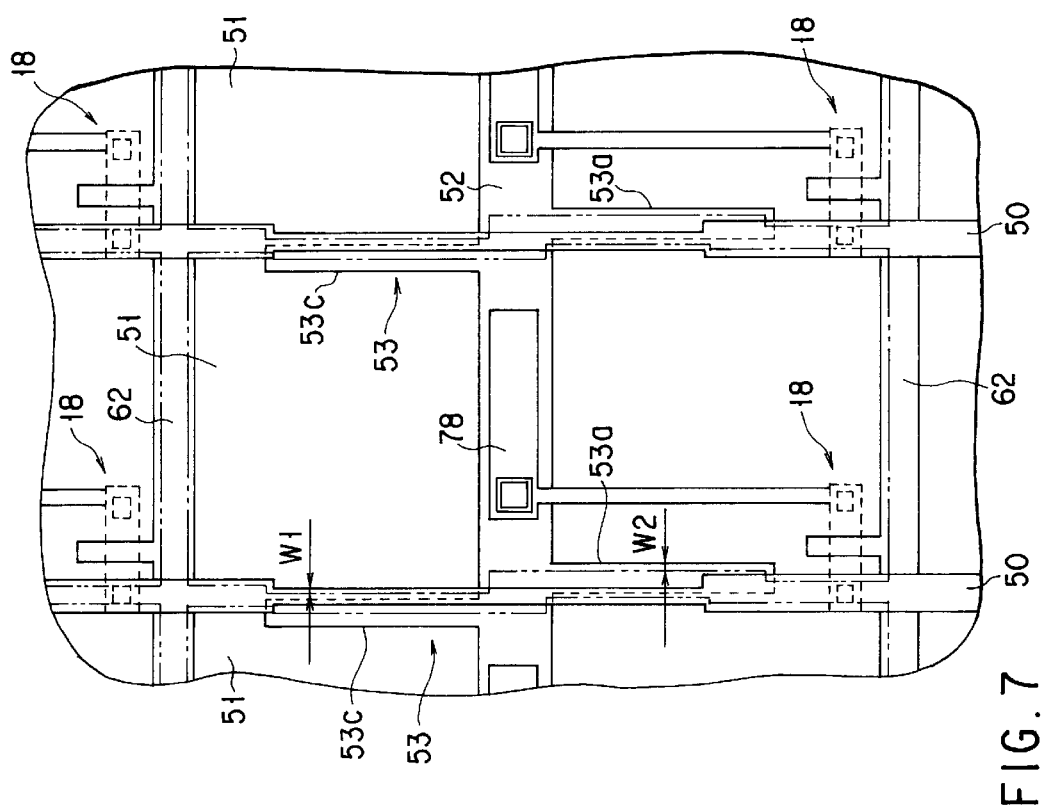
FIG. 7 is a plan view showing the array substrate of the liquid crystal display device according to a fourth embodiment of the present invention.

According to a fourth embodiment shown in FIG. 7, each auxiliary capacitance line 52 is arranged substantially in the midway between two adjacent scanning lines 62. Each shield electrode 53 comprises first and second shield electrodes 53a, 53c extending in opposite directions from the auxiliary capacitance line 52 and is formed entirely in the key shape. With such a structure also, the same operation and effect as the above described embodiments can be obtained.

Figure 8:
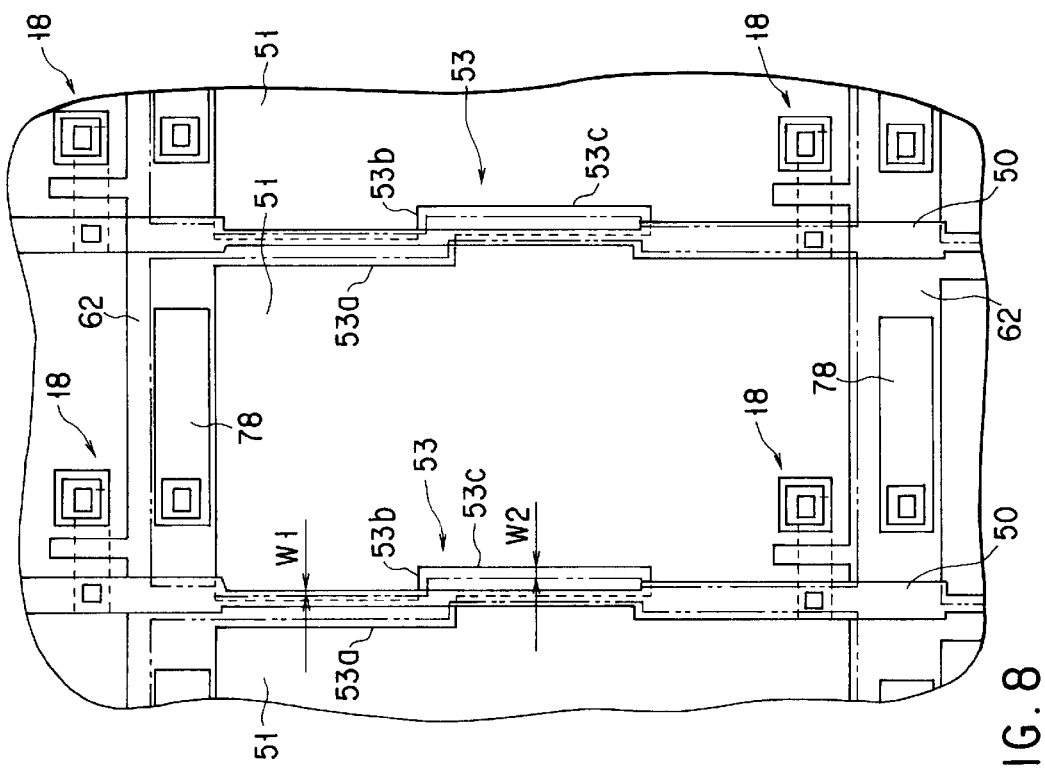
FIG. 8 is a plan view showing the array substrate of the liquid crystal display device according to a fifth embodiment of the present invention.

According to a fifth embodiment shown in FIG. 8, each shield electrode 53 is formed by extending part of a scanning line 62 on a preceding stage, and in the key shape comprising the first electrode portion 53a, bent portion 53b and second electrode portion 53c. With such a structure, the auxiliary capacitance line is not necessary, so that a much higher aperture ratio can be obtained.

In the second-fourth embodiments, the other structure is the same as the first embodiment and therefore, the same reference numerals are attached to the same components, and a description thereof is omitted.

Figure 9:
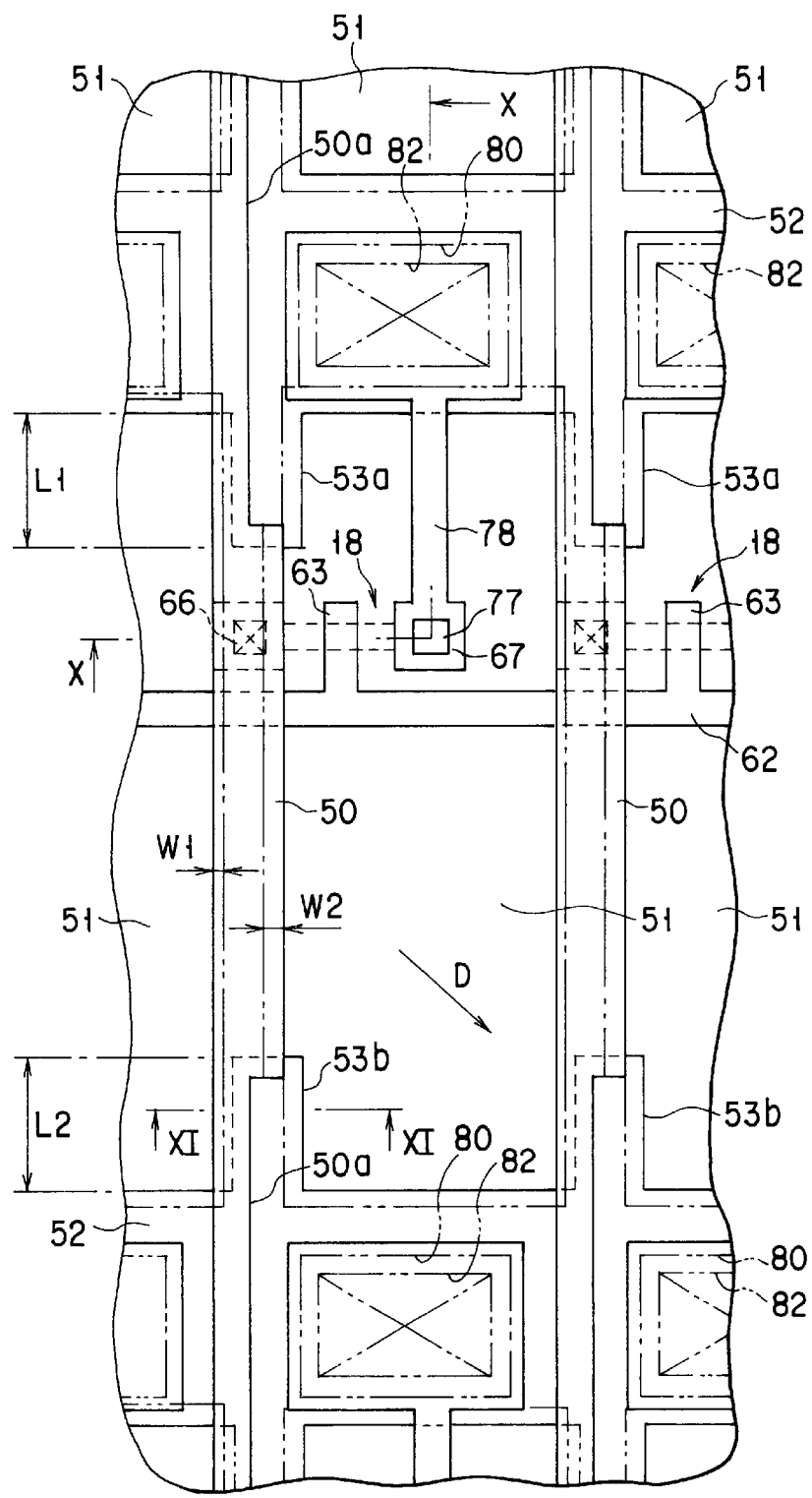
FIGS. 9 to 11 are views showing an active matrix type liquid crystal display device according to a sixth embodiment of the present invention.
Figure 10:
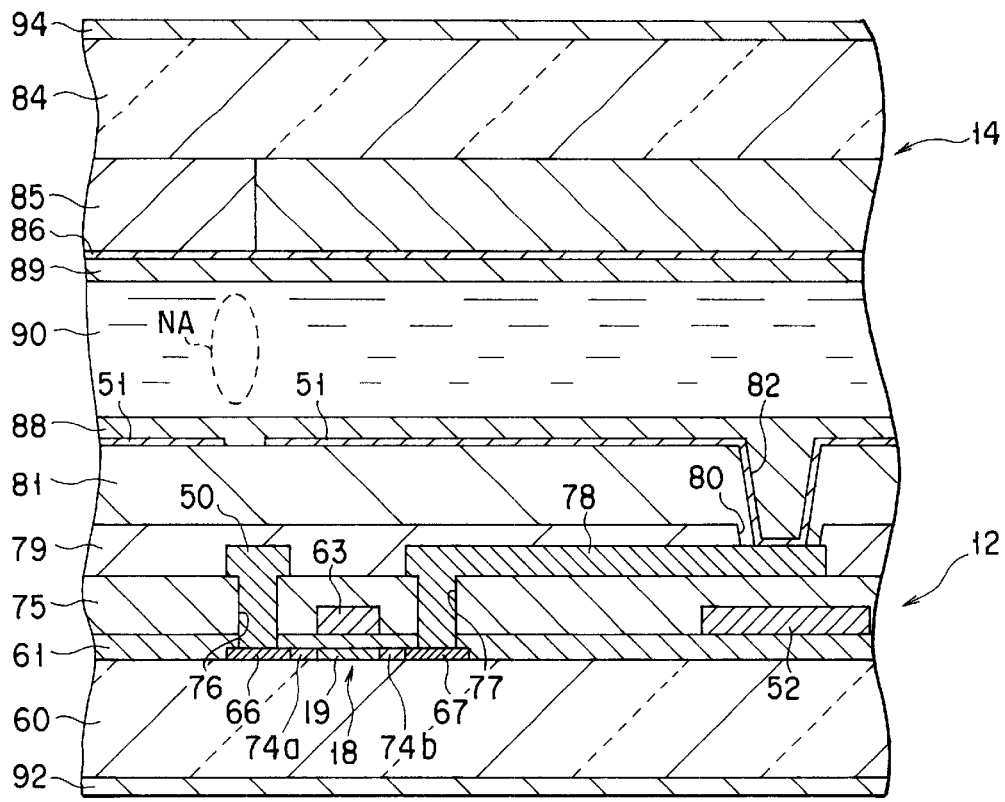
Figure 11:
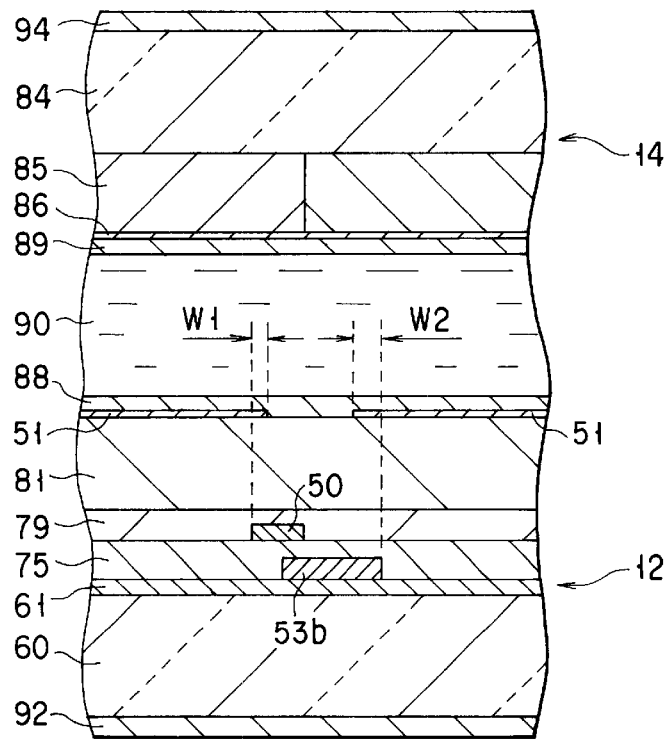

Next, the active matrix type liquid crystal display device according to a sixth embodiment of the present invention will be described. As shown in FIGS. 9 to 11, the liquid crystal display device 10 has the rectangular array substrate 12 and opposing substrate 14. The array substrate 12 and opposing substrate 14 are disposed so as to oppose each other with a predetermined gap by bonding them along their peripheries with sealing agent (not shown). Then, the liquid crystal layer 90 is loaded between the array substrate 12 and opposing substrate 14 each via the orientations films 88, 89.

The array substrate 12 has the glass substrate 60 as an insulating substrate, and a plurality of the signal lines 50 and a plurality of the scanning lines 62 are provided on this glass substrate in a matrix shape such that they intersect each other substantially at right angle. The signal line 50 is formed on the scanning lines 62 via the layer insulating film 75. Further, the auxiliary capacitance line 52 is provided between two adjacent scanning lines 62 on the glass substrate 60 such that it extends in parallel to the scanning lines. The auxiliary capacitance line 52 is formed by patterning the same layer as the scanning lines 62.

A pixel electrode 51 composed of ITO is provided in a region surrounded by two signal lines 50 and two scanning lines 52. Each pixel electrode is connected to an intersection between the signal line 50 and scanning line 62 through the TFT 18 as a switching element. Each pixel electrode 51 is formed substantially in a rectangular shape so as to construct a single pixel. The source electrode 67 of the TFT 18 is connected to the pixel connecting electrode 78. This pixel connecting electrode is connected to the pixel electrode 51 through the through hole 82 formed in the organic insulating substrate 81.

Like the first embodiment described above, the signal line driving circuit portion is formed on an end portion on a long side of the array substrate 12. Further, the scanning line driving circuit portion is formed on a short side thereof. A plurality of the signal lines 50 are introduced to the long side of the array substrate 12 and connected to the signal line driving circuit portion. Further, a plurality of the scanning lines 62 are introduced to the short side of the array substrate 12 and connected to the scanning line driving circuit portion.

Explaining further in detail, each signal line 50 is formed in a linear shape. As described later, a side edge, for example, right side edge of the signal line 50 near each auxiliary capacitance line 52 is cut out so as to be formed in a smaller width than the other portion. Further, the array substrate 12 has the shield electrode having electrostatic shielding characteristic formed by extending part of the auxiliary capacitance line 52 along each signal line 50. Each shield electrode 53 comprises first and second electrodes 53a, 53b extending in opposite directions from the auxiliary capacitance line 52.

In FIG. 9, the first electrode portion 53a and second electrode portion 53b are provided deviated to the right with respect to the signal line 50. The signal line 50 is cut out at a portion 50a which overlaps the auxiliary capacitance line 52 and the first/second electrode portions 53a, 53b of the shield electrode 53 so that the cut out portion has a smaller width than the other portions. Further, this portion overlaps slightly the side edges of the first and second electrode portions 53a, 53b.

Each pixel electrode 51 is arranged such that the side edge of each of a pair of the short sides overlaps each of the auxiliary capacitance lines 52 on both sides by a predetermined width. The long side edge on the right of each pixel electrode 51 is formed linearly and overlaps the left side edge portion (first side edge portion) of the signal line 50 by a predetermined width W1. The long side edge portion on the left thereof is formed in the shape of step, so that it overlaps the first and second electrode portions 53a, 53b of the shield electrode 53 and the right side edge portion (second side edge portion) of the signal line 50 by a predetermined width W2.

The signal line 50 and shield electrode 53 provided such that they partially overlaps the pixel electrode 51 act as a light shielding body for shielding a gap relative to the pixel electrode. A direction indicated by an arrow D of FIG. 9 means an orientation vector of the alignment film 88. Alignment fault region NA of the liquid crystal layer 90 is likely to occur on the right side edge portion of each signal line 50. Therefore, the overlapping width W2 between the pixel electrode 51 and the shield electrode 53 is formed larger than the overlapping width W1 between the pixel electrode 51 and signal line 50.

The electrode length L1 of the first electrode portion 53a of the shield electrode 53 is set to be equal to the electrode length L2 of the second electrode portion 53b. Further, influences of two signal lines adjacent across the pixel electrode 51 are adjusted so as to be equal to each other. Consequently, an influence of the signal line 50 connected to the TFT 18 with respect to the pixel electrode 51, namely the signal line on the left of the pixel electrode becomes substantially the same as an influence of the signal line 50 not connected to the TFT, namely the signal line on the right of the pixel electrode. As a result, an influence of the parasitic capacity between two signal lines and the pixel electrode 51 can be suppressed to its minimum limit.

Further, a portion of each signal line 50 which overlaps the auxiliary capacitance line 52 and the shield electrode 53 is cut out at a portion 50a beside the through hole 82 and consequently, this portion has a smaller width than the other portions. Thus, the sizes of an end portion of the pixel connecting electrode 78, beside the auxiliary capacitance line 52 and the through hole 82 of the organic insulating film 52 can be increased. As a result, the formation error of the through hole 82 is prevented, so that the active matrix type liquid crystal display device having few point defects and high display quality can be achieved.

Next, the structure of the liquid crystal display device 10 will be described in detail with its production method.

First, a-Si film is applied in thickness of about 50 nm on the insulating substrate 60 having light transmission characteristic such as high distortion point glass and quartz substrate according to CVD method. After this a-Si film is annealed for an hour at 450° in a furnace, XeCl excimer laser is projected thereover so as to polycrystallize a-Si. After that, the polycrystalline Si is patterned according to photo-etching method, polysilicon film 19 is formed, which will become a channel layer of TFT 18 for the pixel portion (hereinafter referred to as pixel TFT) in the display region.

Next, gate insulating film 61 composed of SiOx film is applied on an entire surface of the substrate 60 according to the CVD method in the thickness of about 100 nm. Subsequently, single body, its laminated film or alloy film of Ta, Cr, Al, Mo, W, Cu or the like is applied in the thickness of about 200 to 400 nm on an entire surface of the gate insulating film 61. Then, patterning in a predetermined shape is carried out according to the photo-etching method so as to form the scanning lines 62 integrated with the gate electrode 63 and auxiliary capacitance line 52. At this time, the shield electrode 53 is formed in a predetermined shape at a predetermined position at the same time when the auxiliary capacitance line 52 is formed.

After that, impurity is implanted into the polysilicone film 19 with the gate electrodes 62 as mask according to ion implantation or ion doping method so as to form the drain electrode 66 and source electrode 67 of the pixel TFT 18. For example, phosphor is implanted in a high density by $PH_3/H_2$ with dose amount of $5\times10^{15}$ atoms/cm$^2$ at an accelerating voltage of 80 keV. After that, by annealing the substrate 60, the impurity is activated.

After that, the impurity is implanted into the pixel TFT 18 so as to form N channel type LDD (lightly doped drain) 74a, 74b and then, by annealing the array substrate, the impurity is further activated.

Subsequently, the layer insulating film 75 composed of $SiO_2$ is applied in the thickness of about 500 nm to 700 nm on an entire surface of the insulating substrate 60. Further, a contact hole 76 leading to the drain electrode 66 of the pixel TFT 18 and a contact hole 77 leading to the source electrode 67 are formed according to the photo-etching method.

Next, single body, its laminated film or alloy film of Ta, Cr, Al, Mo, W, Cu or the like is applied in the thickness of about 500 nm to 700 nm and then, patterning in a predetermined shape is carried out according to the photo-etching method so as to conduct wiring of the signal line 50 and pixel connecting electrode 78, connection of the drain electrode 66 of the pixel TFT 18 with the signal line 50, and connection of the source electrode 67 with the pixel connecting electrode.

Further, protective insulating film 79 composed of SiNx is formed on an entire surface of the insulating substrate 60 according to the PECVD method and then, a through hole 80 leading to the pixel connecting electrode 78 is formed according to the photo-etching method. Next, after the entire surface of the substrate is coated with organic insulating film 81 in the thickness of about 2 to 4 μm and then, a through hole 82 leading to the pixel connecting electrode 78 is formed.

Finally, ITO is formed in the thickness of about 100 nm on the organic insulating film 81 according to the sputtering method and patterning in a predetermined shape is carried out according to the photo-etching method so as to form the pixel electrode 51. Then, the pixel electrode 51 is connected to the upper electrode 78 through the contact holes 80, 82. Consequently, the array substrate 12 of the liquid crystal display device 10 is obtained.

On the other hand, the opposing substrate 14 is formed as an insulating substrate having transparency. It is obtained by forming a colored layer 85 in which pigment and the like are dispersed on the glass substrate 84, for example, and forming an opposing electrode 86 which is a transparent electrode composed of ITO according to the sputtering method.

Alignment films 88, 89 composed of low-temperature cure type polyimide are printed on the entire surfaces of the pixel electrode 51 of the array substrate 12 and the opposing electrode 86 of the opposing substrate 14. Then, rubbing processing is carried out so that the orientation axes are different by 90° when these substrates are disposed so as to oppose each other. After that, the array substrate 12 and the opposing substrate 14 are disposed so as to oppose and assembled into a cell unit. Then, nematic liquid crystal 90 is injected into a gap therebetween and that gap is sealed. Then, polarizing plates 92, 94 are attached to outside faces of the insulating substrates 60, 84 of both the substrates 12, 14 so as to complete the liquid crystal display device 10.

In the liquid crystal display device having such a structure, the shield electrode 53, which is formed for each pixel in the array substrate 12, is formed only on a single side with respect to the signal line 50. Therefore, a necessity of the conventional gap between the shield electrodes is eliminated. Further, because the signal line 50 and the shield electrode 53 have to overlap each other only on a single side thereof, the signal line 50 can be formed with a minimum processing width.

Consequently, a high aperture ratio can be achieved while the same electrostatic shielding effect as conventional is maintained. As a result, picture quality failure such as cross-talk and uneven luminance is reduced so as to improve the display quality.

Further, a portion of each signal line 50 which overlaps the auxiliary capacitance line 52 and the shield electrode 53 is cut out at a portion 50a beside the through hole 82 and consequently, this portion has a smaller width than the other portions. Thus, the sizes of an end portion of the pixel connecting electrode 78 beside the auxiliary capacitance line 52 and the through hole 82 of the organic insulating film 52 can be increased. As a result, the formation error of the through hole 82 is prevented, so that the active matrix type liquid crystal display device having few point defects and high display quality can be achieved.

Figure 12:
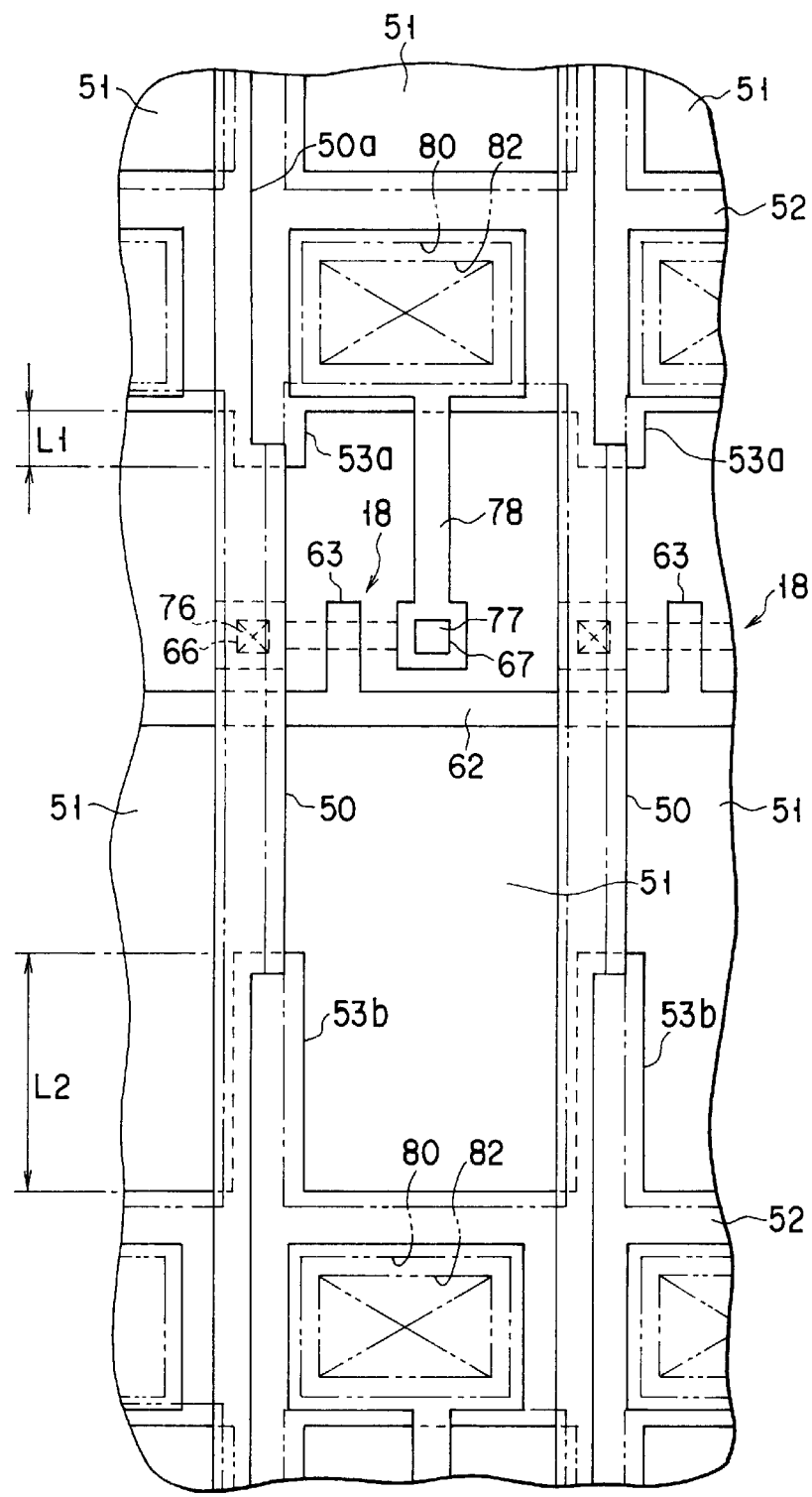
FIG. 12 is a plan view showing the array substrate of the liquid crystal display device according to a seventh embodiment of the present invention.

According to a seventh embodiment of the present invention shown in FIG. 12, the electrode length L1 of the first electrode portion 53a of the shield electrode 53 and the electrode length L2 of the second electrode portion 53b are adjusted so that a minimum distance between the first electrode portion 53a and scanning line 62 is equal to a minimum distance between the second electrode portion 53b and scanning line 62, and so that influences of two signal lines adjacent across the pixel electrode 51 are equal.

With such a structure also, the same operation and effect as the sixth embodiment described above are obtained.

Because the distance between the scanning line 62, and the first and second electrode portions 53a, 53b is adjusted so as to be the largest, probability of occurrence of short-circuit between the scanning line 62 and the shield electrode 53, namely the auxiliary capacitance line 52 can be reduced, so as to improve the yield rate of the array substrate 10.

Figure 13:
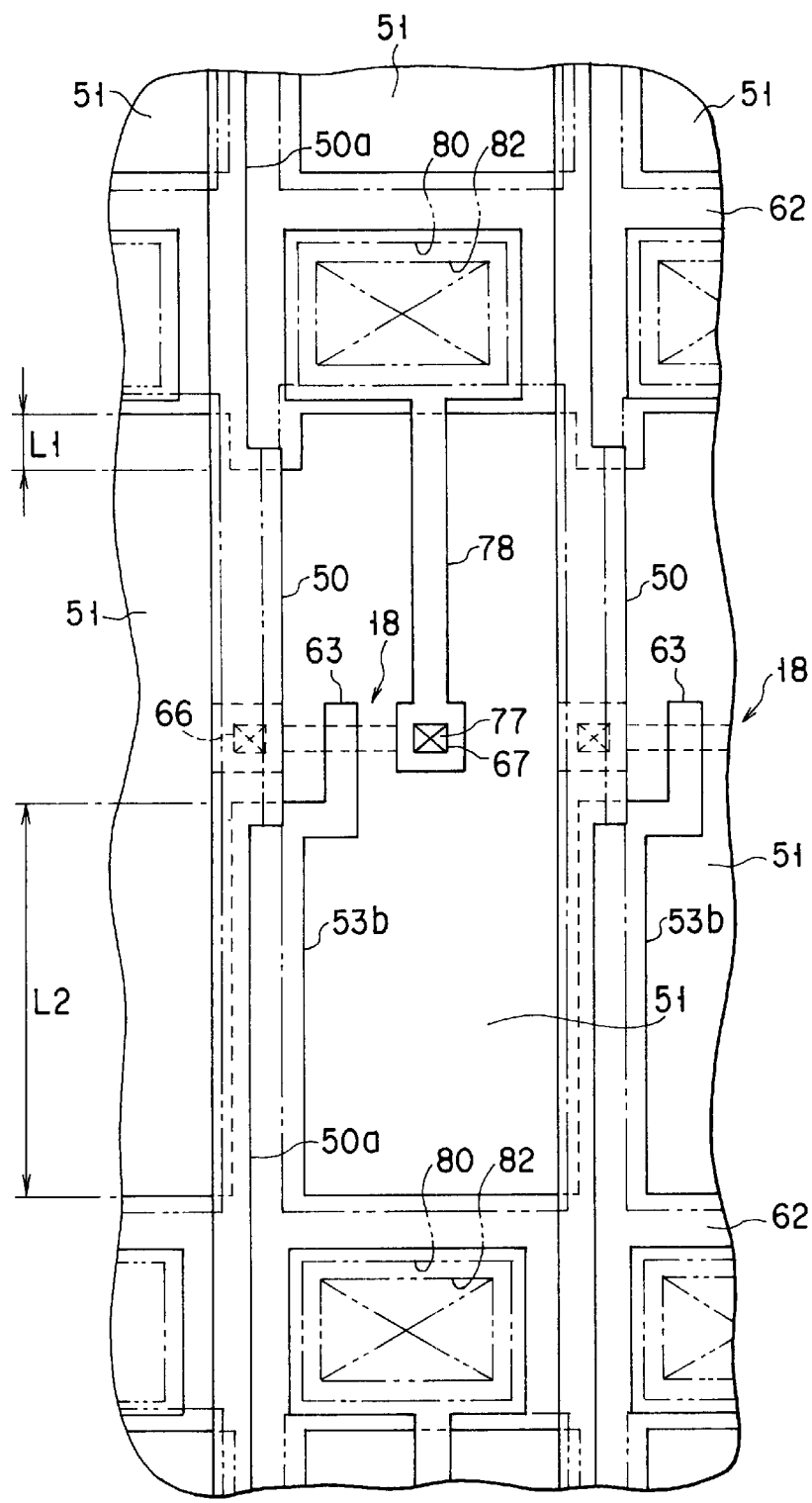
FIG. 13 is a plan view showing the array substrate of the liquid crystal display device according to an eighth embodiment of the present invention.

According to an eighth embodiment shown in FIG. 13, the auxiliary capacitance line 52 is omitted and the scanning line 62 is provided at a position of the auxiliary capacitance line in the sixth and seventh embodiments. Then, the shield electrode 53 is formed by extending part of each scanning line 62 along each signal line 50. Each shield electrode 53 has first and second electrode portions 53a, 53b extending in opposite directions from the scanning line 62. The second electrode portion 53b is formed longer than the first electrode portion 53a and its extension end forms a gate electrode 18. The through holes 80, 82 for joining the pixel connecting electrode 78 and the pixel electrodes 51 are provided so as to overlap the scanning line 62.

The other structure is the same as the sixth embodiment. The same reference numerals are attached to the same components and a description thereof is omitted. In the eighth embodiment also, the same operation and effect as the above-described respective embodiments can be obtained and the auxiliary capacitance line is not necessary. As a result, a much higher aperture ratio can be obtained.

Although the above described embodiments are stated about the active matrix type liquid crystal display device using the polysilicon layer as its semiconductor layer, the present invention may be applied to the active matrix type liquid crystal display device using other semiconductor layer such as amorphous silicone layer as its semiconductor layer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An active matrix type liquid crystal display device comprising:

first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of pixel electrodes each of which is arranged in a region surrounded by the scanning lines and the signal lines and connected to an intersection between the signal line and the scanning line via a switching element, each of the pixel electrodes being formed on a layer above the signal lines such that at least part of the pixel electrode overlaps the signal lines; and a plurality of shield electrodes having electrostatic shielding characteristic and extending from the scanning lines along the signal lines;

each of the shield electrodes having a first electrode portion arranged to overlap only a side edge portion of one of two adjacent pixel electrodes and a side edge portion on the side of the one pixel electrode of the signal line side edge portions; and a second electrode portion arranged to overlap only a side edge portion of the other pixel electrode and the other side edge portion of the signal line, and an overlapping width between the shield electrode and the pixel electrode being larger than an overlapping width between the signal line and the pixel electrode.

2. A liquid crystal display device according to claim 1, wherein the overlapping width between the first electrode of each of the shield electrodes and the one pixel electrode is larger than the overlapping width between the signal line and the one pixel electrode.

3. A liquid crystal display device according to claim 1, wherein the overlapping width between the second electrode of each of the shield electrodes and the other pixel electrode is larger than the overlapping width between the signal line and the other pixel electrode.

4. A liquid crystal display device according to claim 1, wherein the insulating film is arranged between the signal lines and the shield electrodes and a difference between the overlapping width between the first electrode portion of the shield electrode and the one pixel electrode and the overlapping width between the signal line and the one pixel electrode is substantially equal to the film thickness of the insulating film.

5. A liquid crystal display device according to claim 1, wherein each of the signal lines is formed linearly and each of the shield electrodes has a bent portion joining together the first and second electrode portions.

6. A liquid crystal display device according to claim 1, wherein each of the shield electrodes is formed linearly and the signal line located between the pixel electrodes adjacent to each other comprises a portion overlapping the first electrode portion of the shield electrode, a portion overlapping the second electrode portion of the shield electrode, and a bent portion joining together the portions.

7. A liquid crystal display device according to claim 1, wherein each of the auxiliary capacitance lines is disposed substantially in the center between two adjacent scanning lines and the first and second electrode portions of each of the shield electrodes extend in opposite directions from each of the auxiliary capacitance lines.

8. A liquid crystal display device comprising:

first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of pixel electrodes each of which is arranged in a region surrounded by the scanning lines and the signal lines and connected to an intersection between the signal line and the scanning line via a switching element, each of the pixel electrodes being formed on a layer above the signal lines such that at least part of the pixel electrode overlaps the signal lines; and a plurality of shield electrodes having electrostatic shielding characteristic and extending from the scanning lines along the signal lines;

each of the shield electrodes having a first electrode portion arranged to overlap only a side edge portion of one of two adjacent pixel electrodes and a side edge portion on the side of the one pixel electrode of the signal line side edge portions; and a second electrode portion arranged to overlap only a side edge portion of the other pixel electrode and the other side edge portion of the signal line, and an overlapping width between the shield electrode and the pixel electrode being larger than an overlapping width between the signal line and the pixel electrode.

9. A liquid crystal display device according to claim 8, wherein the overlapping portion between the first electrode portion of each of the shield electrodes and each of the pixel electrodes is larger than the overlapping width between the signal line and each of the pixel electrodes.

10. A liquid crystal display device according to claim 8, wherein the overlapping width between the second electrode of each of the shield electrodes and the other pixel electrode is larger than the overlapping width between the signal line and the other pixel electrode.

11. A liquid crystal display device comprising:

first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of auxiliary capacitance lines each of which is arranged between the two adjacent scanning lines and extends in a direction substantially perpendicular to the signal lines; a plurality of shield electrodes having electrostatic shielding characteristic and extending from the auxiliary capacitance lines along the signal lines; and a plurality of pixel electrodes each of which is arranged in a region surrounded by the signal lines and the auxiliary capacitance lines and connected to an intersection between the signal line and the scanning line via a switching element, each of the pixel electrodes being arranged such that at least part of the pixel electrode overlaps the signal lines and the auxiliary capacitance lines;

each of the shield electrodes having first and second electrode portions extending in opposite directions from the auxiliary capacitance line along the signal line, the signal line located between two adjacent pixel electrodes having a first side edge portion overlapping one of the pixel electrodes and a second side edge portion overlapping the other pixel electrode, the first and second electrode portions of each shield electrode overlapping only the other pixel electrode and the second side edge portion of the signal line, and an overlapping width between the one pixel electrode and the first side edge portion of the signal line being different from an overlapping width between the other pixel electrode, and the second side edge portion of the signal line and shield electrode.

12. A liquid crystal display device according to claim 11, wherein the overlapping width between each of the shield electrodes and the other pixel electrode is larger than the overlapping width between the signal line and the one pixel electrode.

13. A liquid crystal display device according to claim 11 further comprising a connecting electrode formed by patterning the same layer as the signal lines, the connecting electrode having an end portion connected to a source electrode of the switching element and the other end portion located overlapping the auxiliary capacitance line, the other end portion being connected to the pixel electrode through a through hole positioned on the auxiliary capacitance line, each of the signal lines having an overlapping portion which overlaps the auxiliary capacitance line and shield electrode, a side edge portion on the side close to the through hole of the overlapping portion being cut off so that the overlapping portion has a smaller width than the other portions.

14. A liquid crystal display device according to claim 11, wherein extending lengths of the first electrode portion and second electrode portion of the shield electrode are substantially equal.

15. A liquid crystal display device according to claim 11, wherein a distance between the first electrode portion of the shield electrode and the scanning line is substantially equal to a distance between the second electrode portion and the scanning line.

16. An active matrix type liquid crystal display device comprising:

first and second substrates opposing each other with interposing a liquid crystal layer between the first and second substrates, the first substrate including: an insulating substrate; a plurality of scanning lines arranged substantially in parallel with one another on the insulating substrate; a plurality of signal lines provided on the scanning lines via an insulating film and extending in a direction crossing the scanning lines; a plurality of shield electrodes having electrostatic shielding characteristic and extending from the scanning lines along the signal lines; and a plurality of pixel electrodes each of which is arranged in a region surrounded by the signal lines and the scanning lines and connected to an intersection between the signal line and the scanning line via a switching element, each of the pixel electrodes being arranged such that at least part of the pixel electrode overlaps the signal lines and the scanning lines;

each of the shield electrodes having first and second electrode portions extending in opposite directions from the scanning line along the signal line, the signal line located between two adjacent pixel electrodes having a first side edge portion overlapping one of the pixel electrodes and a second side edge portion overlapping the other pixel electrode, the first and second electrode portions of each shield electrode overlapping only the other pixel electrode and the second side edge portion of the signal line, and an overlapping width between the one pixel electrode and the first side edge portion of the signal line being different from an overlapping width between the other pixel electrode, and the second side edge portion of the signal line and shield electrode.

17. A liquid crystal display device according to claim 16, wherein an overlapping width between the first and second electrode portions of each of the shield electrodes and the other pixel electrode is larger than the overlapping width between the signal line and the one pixel electrode.

18. A liquid crystal display device according to claim 16 further comprising a connecting electrode formed by patterning the same layer as the signal lines, the connecting electrode having an end portion connected to a source electrode of the switching element and the other end portion located overlapping the scanning line, the other end portion being connected to the pixel electrode through a through hole positioned on the scanning line, each of the signal lines having an overlapping portion which overlaps the scanning line and shield electrode, a side edge portion on the side close to the through hole of the overlapping portion being cut off so that the overlapping portion has a smaller width than the other portions.

* * * * *